United States Patent [19]

Matczak et al.

[11] Patent Number: 5,391,004
[45] Date of Patent: Feb. 21, 1995

[54] HUB SEAL ASSEMBLY

[75] Inventors: Stanley E. Matczak, Ellington; Joseph A. Matczak, Talcotville, both of Conn.

[73] Assignee: Seals-It, East Hartford, Conn.

[21] Appl. No.: 5,483

[22] Filed: Jan. 15, 1993

[51] Int. Cl.$^6$ .............................................. F16C 33/78
[52] U.S. Cl. ...................................... 384/477; 384/485; 384/589
[58] Field of Search ............... 384/477, 589, 544, 485; 277/DIG. 6

[56] References Cited

U.S. PATENT DOCUMENTS

| 2,516,567 | 7/1950 | Hamm . | |
|---|---|---|---|
| 2,536,784 | 1/1951 | Tamm . | |
| 3,420,590 | 1/1969 | Bilocg . | |
| 3,759,592 | 9/1973 | Carlson . | |
| 4,265,496 | 5/1981 | Kofink . | |
| 4,402,558 | 9/1983 | Olschewski et al. . | |
| 4,609,293 | 9/1986 | Bayer et al. . | |
| 4,941,757 | 6/1990 | Hall . | |
| 4,990,000 | 2/1991 | Harsdorff | 384/544 |
| 5,017,025 | 5/1991 | Williams . | |
| 5,147,139 | 9/1992 | Lederman | 384/477 |
| 5,147,702 | 9/1992 | Aoyagi | 277/DIG. 6 |

Primary Examiner—Lenard A. Footland
Attorney, Agent, or Firm—Fishman, Dionne & Cantor

[57] ABSTRACT

A hub seal is presented. The hub seal is disposed between inner and outer bearings about an automobile axle within a hub housing. The bearings are disposed between the hub housing and the axle at each end of the hub housing. The hub seal comprising a rigid sleeve having sealing members affixed at each end thereof. The sealing members are in sealing contact with the bearings and support the sleeve away from the axle.

26 Claims, 2 Drawing Sheets

HUB SEAL ASSEMBLY

BACKGROUND OF THE INVENTION

This invention relates generally to seals. More particularly, this invention relates to a hub seal for use primarily with an automobile hub housing.

Seals are known in the prior art, for example: U.S. Pat. No. 4,609,293 to Bayer et al; U.S. Pat. No. 4,402,558 to Olschewski et al; U.S. Pat. No. 5,017,025 to Williams and U.S. Pat. No. 3,759,592 to Carlson. However, this list is only exemplary and is not intended to be a complete listing of the prior art.

U.S. Pat. No. 4,609,293 to Bayer et al discloses a lubrication feed bushing disposed in a radial space between a shaft and an external bushing or a bearing housing around the shaft. U.S. Pat. No. 4,402,558 to Olschewski et al discloses a lubricant collector closed off to the outside radially and laterally, and is defined by a radially inwardly located wall of the rim of the cap and having a small port or opening in the radially inwardly located wall which runs into the lubricant collector. U.S. Pat. No. 5,017,025 to Williams discloses an outboard seal which includes a seal case and a shield with an elastomeric seal element therebetween. U.S. Pat. No. 3,759,592 to Carlson discloses bearing seals having a lower seal and an upper seal. The seals provide an axially opening recess which serves as a reservoir for lubricant.

Automobile hub housing (e.g. "wide 5 hub") are also known in the prior art. The hub housing is disposed about an automobile axle with inner and outer bearings between the axle and the hub housing at opposing ends of the hub housing. The hub housing also has a generally cylindrical cavity. The bearings are packed with grease or other lubricant. However, when the hub housing is rotated a high speeds the lubricant is thrown into the cavity and deposited at the interior surface of the hub housing by centrifugal forces. This can cause wheel imbalance and the ring and pinion to run dry. Further, the bearings must be repacked often and the hub housing cleaned as a result of the thrown lubricant.

SUMMARY OF THE INVENTION

The above-discussed and other drawbacks and deficiencies of the prior art are overcome or alleviated by the hub seal of the present invention. In accordance with the present invention a hub seal is disposed between inner and outer bearings about an automobile axle within a hub housing. The bearings are disposed between the hub housing and the axle at each end of the hub housing. The hub seal comprising a rigid sleeve having sealing members affixed at each end thereof. The sealing members are in sealing contact with the bearings and support the sleeve away from the axle.

In contrast to the prior art, lubricant within the bearings of the present invention is not thrown into the cavity of the hub housing by the centrifugal forces of the rotating hub housing, rather it is maintained at the bearings by the hub seal.

Accordingly, the prior art problems of wheel imbalance, frequent repacking of the bearings, and running the ring and pinion dry are avoided. The aforementioned prior art seals are not suitable for resolving the above prior art problems commonly encountered with hub assemblies.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DESCRIPTION OF THE PREFERRED EMBODIMENT

Figure 1:
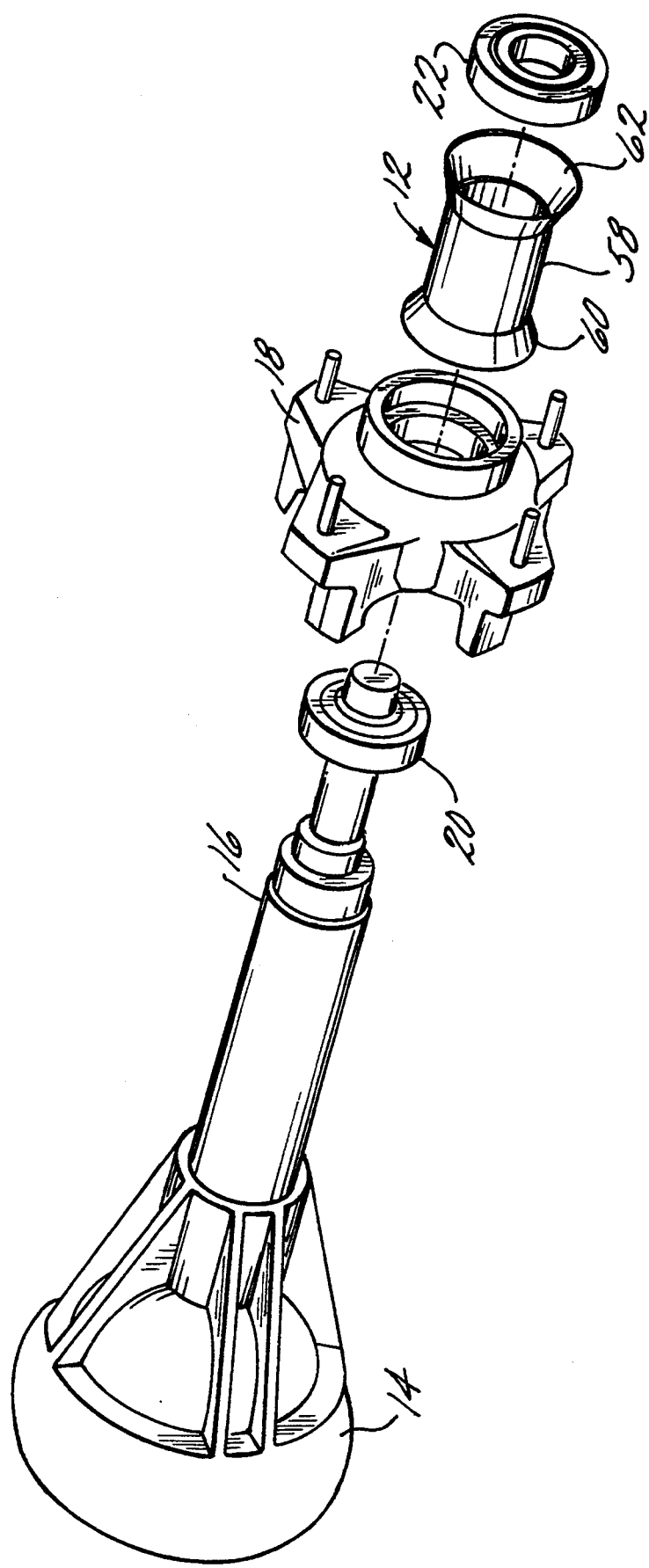
FIG. 1 is an exploded view of a drive housing assembly employing a hub seal in accordance with the present invention.

Referring to FIG. 1, an exploded view of a drive housing assembly 10 employing a hub seal 12 in accordance with the present invention is shown. Assembly 10 comprises a drive housing 14 having drive shaft (or axle) 16 extending therefrom. Housing 14 includes a ring and pinion assembly not shown. A hub assembly 18 is disposed about shaft 16 between inner and outer bearings 20 and 22. Hub seal 12 is disposed within hub assembly 18 about shaft 16 between bearings 20 and 22.

Figure 2:
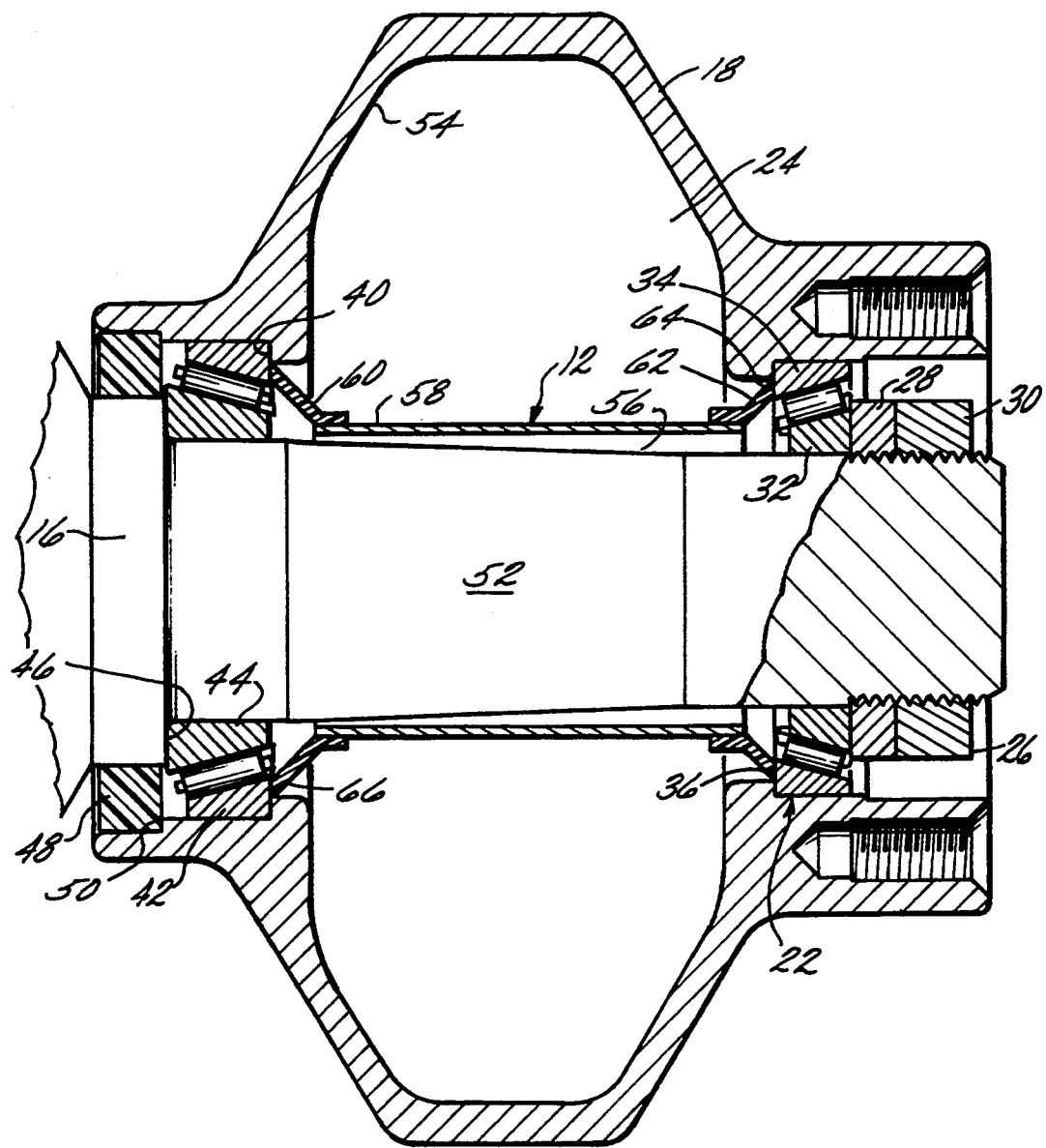
FIG. 2 is a partial cross sectional elevational view of hub housing end of the drive housing assembly of FIG. 1.

Referring to FIG. 2, a cross sectional view of the assembled hub assembly end of the drive housing assembly 10 is shown. Housing 18 has an inner cavity 24. A retaining ring assembly 26 retains housing 18 on shaft 16. Assembly 26 comprises a washer 28 and nut 30. Assembly 26 bears against a race 32 of outer bearing 22. A race 34 of bearing 22 bears against a shoulder 36 of housing 18. Another shoulder 40 of housing 18 bears against a race 42 of bearing 20 and a race 44 bears against a shoulder 46 of shaft 16. A seal 48 is retained between shaft 16 and housing 18 of a shoulder 50 of housing 18.

A shaft portion 52 of shaft 16 is tapered and thread at one end thereof. The treads provide for a rotary connection with the retaining ring assembly 26.

Bearings 20 and 22 are typically packed with grease or other lubricant (not shown) which is thrown outwardly from the bearings 20, 22 when hub 18 is rotated at high speeds (such as encountered with an automobile). These centrifugal forces tend to throw the grease into cavity 24 of housing 18 and is generally deposited on interior surface 54 of housing 18.

However, in accordance with the present invention hub seal 12 is disposed about shaft portion 52 between bearings 20 and 22. With hub seal 12 installed the grease (not shown), packed in bearings 20 and 22, is only thrown into a gap 56 between seal 12, shaft 52 and bearings 20, 22 by the centrifugal forces induced by the rotation of the hub 18. These centrifugal force further forces the grease back into the bearings 20 and 22.

Hub seal 12 comprises a rigid sleeve or tube 58. Sleeve 58 is preferably comprised of a light weight metal (e.g., aluminum), however a plastic or other suitable rigid material may be employed. Sealing members 60 and 62 are secured at opposing ends of sleeve 58. Each sealing member 60 and 62 includes a conically shaped portion and a cylindrically shaped portion (as is best shown in FIG. 1). One end 64 of member 62 bears against race 34 of bearing 22 providing a seal therebetween. One end 66 or member 60 bears against race 42 of bearing 20 providing a seal therebetween. While sealing members 60 and 62 are flexible relative to sleeve 58 they are also sufficiently rigid to maintain sleeve 58 of hub seal 12 away from shaft 52. Members 60 and 62 are comprised of a polymer such as nitrile or neoprene as well as plastics of other suitable sealing materials (e.g., rubber). The cylindrically shaped portion of each member 60, 62 is fused or otherwise bonded to sleeve 58 by any known method (e.g., adhesive bonding, chemical bonding or mechanical means of attachment).

Hub seal 12 is easily installed in a hub assembly (e.g., hub assembly 18) without the need of special tooling. Retaining ring assembly 26 and outer bearing 22 are removed, as is well known in the art. Then hub seal 12 is slid over the shaft and the outer bearing 22 and retaining ring assembly are reinstalled, again as is well known in the art.

While hub seal 12 has been described for use with a hub housing for an automobile, other applications will be apparent to one of ordinary skill in the art. More specifically, hub seal 12 may be disposed about any shaft where a seal is desired. It will be appreciated that members 60 and 62 must bear firmly against another surface to complete the seal and retain the hub seal 12 in position.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A seal assembly for providing a seal about a shaft having a pair of spaced apart bearings disposed thereon comprising:
   an elongated cylinder disposed about the shaft; and
   flexible sealing means for sealing affixed to said elongated cylinder at about each end thereof, each of said sealing means engaging a corresponding one of the bearings, each of said sealing means comprising,
   a cylindrical portion attached to a corresponding one of said ends of said elongated cylinder, and
   a conical portion depending from said cylindrical portion and extending away from said corresponding one of said ends of said elongated cylinder.

2. The seal assembly of claim 1 wherein each of said sealing means is comprised of neoprene.

3. The seal assembly of claim 1 wherein said elongated cylinder is comprised of a metal.

4. The seal assembly of claim 1 wherein each of said sealing means is comprised of a polymer.

5. The seal assembly of claim 1 wherein each of said sealing means is comprised of nitrile.

6. A hub assembly mounted on an automobile axle comprising:
   hub housing means having first and second openings, one at each end thereof, said first and second openings having the automobile axle passing therethrough, said hub housing means having a generally cylindrical cavity, said first and second openings extending to said cavity at about the center thereof;
   first bearing means disposed about the automobile axle, said first bearing means disposed between the automobile axle and said hub housing means within said first opening of said hub housing means;
   second bearing means disposed about the automobile axle, said second bearing means disposed between the automobile axle and said hub housing means within said second opening of said hub housing means; and
   sealing means disposed circumferentially about the automobile axle within said hub housing means between said first and second bearing means, said sealing means comprising,
   an elongated cylinder disposed about the automobile axle, and
   a sealing member affixed to said elongated cylinder at about each end thereof.

7. The hub assembly of claim 6 wherein each of said sealing members is comprised of neoprene.

8. The hub assembly of claim 6 wherein said sealing means is in sealing contact with said first and second bearing means.

9. The hub assembly of claim 6 wherein each of said sealing members is comprised of nitrile.

10. The hub assembly of claim 6 wherein each of said sealing members engages a corresponding one of said first and second bearing means.

11. The hub assembly of claim 6 wherein each of said sealing members comprises:
   a cylindrical portion attached to a corresponding one of said ends of said elongated cylinder; and
   a conical portion depending from said cylindrical portion and extending away from said corresponding one of said ends of said elongated cylinder.

12. The hub assembly of claim 6 wherein said elongated cylinder is comprised of a metal.

13. The hub assembly of claim 6 wherein each of said sealing members is comprised of a polymer.

14. A seal assembly for providing a seal about a shaft having a pair of spaced apart bearings disposed thereon comprising:
   an elongated cylinder disposed about the shaft;
   means for sealing affixed to said elongated cylinder at about each end thereof, each of said sealing means engaging a corresponding one of the bearings; and
   wherein each of said sealing means comprises,
   (a) a cylindrical portion attached to a corresponding one of said ends of said elongated cylinder, and
   (b) a conical portion depending from said cylindrical portion and extending away from said corresponding one of said ends of said elongated cylinder.

15. The seal assembly of claim 14 wherein each of said sealing means is comprised of neoprene.

16. The seal assembly of claim 14 wherein each of said sealing means is comprised of nitrile.

17. The seal assembly of claim 14 wherein said elongated cylinder is comprised of a metal.

18. The seal assembly of claim 14 wherein each of said sealing means is comprised of a polymer.

19. A hub assembly mounted on an automobile axle comprising:
   hub housing means having first and second opening at each end thereof, said first and second openings having the automobile axle passing therethrough, said hub housing means having a generally cylindrical cavity, said first and second openings extending to said cavity at about the center thereof;
   first bearing means disposed about the automobile axle, said first bearing means disposed between the automobile axle and said hub housing means within said first opening of said hub housing means;
   second bearing means disposed about the automobile axle, said second bearing means disposed between the automobile axle and said hub housing means within said second opening of said hub housing means;

sealing means disposed about the automobile axle within said hub housing means between said first and second bearing means; and wherein said sealing means comprises,
- (a) an elongated cylinder disposed about the automobile axle, and
- (b) a sealing member affixed to said elongated cylinder at about each end thereof.

20. The hub assembly of claim 19 wherein each of said sealing members is comprised of neoprene.

21. The hub assembly of claim 19 wherein each of said sealing members is comprised of nitrile.

22. The hub assembly of claim 19 wherein said sealing means is in sealing contact with said first and second bearing means.

23. The hub assembly of claim 19 wherein each of said sealing members engages a corresponding one of said first and second bearing means.

24. The hub assembly of claim 19 wherein each of said sealing members comprises:
- a cylindrical portion attached to a corresponding one of said ends of said elongated cylinder; and
- a conical portion depending from said cylindrical portion and extending away from said corresponding one of said ends of said elongated cylinder.

25. The hub assembly of claim 19 wherein said elongated cylinder is comprised of a metal.

26. The hub assembly of claim 19 wherein each of said sealing members is comprised of a polymer.

* * * * *